3,332,883
URANIUM CARBIDE-TUNGSTEN NUCLEAR FUEL COMPOSITION

John Jephson Norreys, Bricket Wood, England, assignor to The General Electric Company Limited
No Drawing. Filed Oct. 29, 1964, Ser. No. 407,537
Claims priority, application Great Britain, Nov. 7, 1963, 43,991/63
2 Claims. (Cl. 252—301.1)

This invention relates to materials suitable for use as fuels in nuclear reactors, and to methods of manufacturing such materials.

Uranium monocarbide has already been proposed for use as a fissile fuel material in nuclear reactors. However, a difficulty sometimes arises in operation of a fuel element comprising fuel composed of this material, in that gases generated at the operating temperature form bubbles which are liable to cause damage to or deformation of the mass of fuel. It would appear that this difficulty could be reduced or overcome if improved creep resistance could be imparted to the fuel material, and it is an object of the present invention to provide a fuel material of a novel composition which possesses improved creep properties as compared with those of substantially pure uranium monocarbide.

According to the invention, a fuel material for a nuclear reactor consists substantially of uranium carbide having a composition in the range of 50% uranium: 50% carbon to 48% uranium: 52% carbon, in atomic percentages, and tungsten in a proportion in the range of 0.05% to 5.0% by weight of the weight of the material.

It will be appreciated that the compound generally referred to as "uranium monocarbide" is not necessarily of stoichiometric composition, but may contain excess carbon or excess uranium. The uranium carbide constituent of the fuel material of the invention may be stoichiometric uranium monocarbide, that is to say may contain 50 at. percent of carbon, or may be of hyper-stoichiometric composition containing up at 52 at. percent of carbon, as indicated above. Uranium carbide containing less than the stoichiometric proportion of carbon should not be employed, since the excess uranium is present in the free state, and considerably reduces the creep resistance of the uranium carbide. The effect of excess carbon, over the stoichiometric proportion, on the creep properties, is much less pronounced, so that up to 2 at. percent excess carbon can be tolerated. The preferred composition of the uranium carbide constituent of the fuel material of the invention is 49.5 at. percent uranium and 50.5 at. percent carbon. We have found that the addition of metallic tungsten, in the proportions specified above, the uranium monocarbide produces a marked increase in the creep resistance of the latter.

It is to be understood that the compositions specified above for the fuel materials of the invention do not exclude the presence of minor amounts of impurities, which may be accidentally introduced either from the starting material or during the manufacturing process, and that the term "substantially" used in the above statement of the invention implies only that such minor impurities might be present.

The fuel material in accordance with the invention is preferably manufactured by arc melting a mixture of uranium, carbon and tungsten, in the required relative proportions. The tungsten can be introduced by using a tungsten electrode for the arc melting of the uranium-carbon mixture; however, it is preferred to use a graphite electrode, and to add the required amount of tungsten initially to the uranium-carbon mixture, since the proportion of tungsten introduced can be controlled more precisely in this way. As an alternative to using a mixture of uranium and carbon, preformed uranium monocarbide of the required composition can be used as the starting material.

The starting materials are conveniently in powder form, although the tungsten can be introduced in the form of larger pieces, which may be obtained, for example, by breaking up a tungsten rod, since even when introduced in this form the tungsten becomes uniformly distributed throughout the mass of uranium carbide during the arc melting process.

The molten mass produced by any of the above arc melting methods may be cast to form a body of a desired shape and size: for example, for manufacture of fuel elements for nuclear reactors, the melt can be cast into cylindrical moulds of the required dimensions.

Another possible method of manufacturing the fuel material of the invention comprises pressing a powdered mixture of uranium, carbon and tungsten, or of uranium monocarbide and tungsten, in the required proportions, to form a compact of a desired shape and size, and sintering the compact.

The cast or sintered bodies of fuel material may, if desired, be subjected to an annealing heat treatment, and are finally cooled relatively slow, conveniently by being retained in the heat treatment furnace while the latter is cooled down to room temperature.

The fuel materials produced by any of the methods described above consist of uranium monocarbide, of the desired composition, containing a substantially uniform dispersion of tungsten. We believe that at least a part of the tungsten content is in solution in the uranium carbide: thus where the proportion of tungsten is relatively small, for example about 1% by weight or less, it is probable that it is wholly in solution in the uranium carbide. However, with larger proportions of tungsten, for example 2% by weight or more, it has been shown by optical microscopy and by X-ray examination that free metallic tungsten is present as a distinct phase in the fuel material. The aforesaid improvement in the creep resistance of the uranium monocarbide is obtained in every case, irrespective of whether the tungsten is present in the free state or wholly in solution.

Some specific methods which we have employed for the manufacture of nuclear reactor fuel materials in accordance with the invention will now be described in the following examples.

Example 1

A mixture of reactor grade uranium and reactor grade graphite, in the relative proportions of 49.5 at. percent uranium and 50.5 at. percent graphite, both in lump form, was placed on a water-cooled copper hearth in an argon arc melting furnace, and was subjected to an arc melting procedure in known manner, using a tungsten cathode. The molten mass was drop-cast into polished graphite moulds, and the castings were held at a temperature of 1400° C. in vacuum for one hour and then retained in the furnace while the latter was cooled to room temperature at 1½ hours, this rate of cooling being sufficiently slow to avoid cracking of the cast body due to thermal stress.

The cast material was found by analysis to consist of uranium monocarbide of substantially the same composition as that of the initial mixture of uranium and graphite with, uniformly distributed therein and apparently in solution (as indicated by X-ray examination), tungsten in the proportion of 0.9% of the weight of the material. Minor impurities present were, in proportions by weight, 0.05% aluminium and 0.005% iron derived from the original uranium, 0.01% titanium derived from titanium employed as a getter in the furnace, about 100 parts per million of nitrogen and a few hundred parts per million of oxygen. The grain size of the solidified cast material was in the range of 0.1 mm. to 1 mm., the mean grain size being approximately 300 microns.

Example 2

A material produced by a similar method to that described in Example 1 was found to contain 0.18% by weight of tungsten, but in other respects was similar to the product of Example 1.

Example 3

The method of this example differed from that of the two previous examples in that a graphite cathode was used for the arc melting process, and the required amount of tungsten was included in the initial mixture. The starting mixture consisted of uranium and graphite, both of reactor grade, in the relative proportions of 48 at. percent uranium and 52 at. percent carbon, and pieces of tungsten rod in the proportion of 2% by weight of the total weight of the mixture. The arc melting, casting and cooling procedure was carried out in the manner described in Example 1.

The tungsten was uniformly distributed throughout the cast product, and a separate phase, dispersed in the mass of uranium carbide, which phase appeared to be free tungsten, could be observed by microscopic examination of the material.

Creep tests have been carried out on the products of the methods described in all the above examples, and the results of these tests are given in the following table. The property determined in each case was the compressive creep, that is to say the rate of reduction in length of a rod of the material under an applied load and at elevated temperature.

For carrying out the creep test, a rod of the material to be tested, 0.3 inch long and 0.18 inch in diameter, was supported in a vertical position by a tungsten anvil set in a water-cooled mild steel pedestal which rested on the base plate of a vacuum chamber, and a load was applied to the upper end of the test specimen through a tungsten push-rod, in order to provide good electrical connection to the specimen. The test specimen was heated by the direct passage of an electric current through it, after evacuation of the chamber: the test temperature was attained in a period of 40 to 50 minutes, and the specimen was held at this temperature for an hour to allow the system to approach thermal equilibrium. The load was then increased to the desired value, and the temperature and the load were kept constant for a number of hours, the specimen then being cooled to room temperature under the load, removed from the apparatus, and its length measured. This procedure was repeated several times, measurement being made after subjection of the specimen to the same temperature and load for total periods of 5, 25, 50, 100 and 150 hours. It was found that after a few hours the rate of deformation of the specimen, as indicated by the rate of reduction in length, became substantially constant: the figure given in the extreme right-hand column of the table, below, for each material, is the percentage reduction in length of the specimen per hour under the load and at the temperature indicated in the preceding columns, over the period of substantially constant rate of deformation. For comparison, corresponding figures are given for specimens of uranium carbide of the same compositions as the uranium carbide forming the basic constituent of the products of the respective examples: these uranium carbide specimens were tested in the same manner as the tungsten-containing materials.

TABLE

| Composition of Specimen | | Load, lbs./ sq. in. | Temperature, ° C. | Reduction in length, percent/hour |
|---|---|---|---|---|
| U:C, Atomic Percent | Weight Percent W | | | |
| 49.5U:50.5C | 0.9 | 5,800 | 1,400 | 0.001 |
| 49.5U:50.5C | 0.18 | 5,500 | 1,350 | 0.0035 |
| 49.5U:50.5C | | 6,000 | 1,400 | 0.05 |
| 48U:52C | 2.0 | 6,000 | 1,400 | 0.005 |
| 48U:52C | | 6,000 | 1,300 | 0.025 |

I claim:

1. A fuel material for a nuclear reactor, consisting substantially of uranium carbide having a composition in the range of 50% uranium: 50% carbon to 48% uranium: 52% carbon, in atomic percentages, and tungsten in a proportion in the range of 0.05% to 5.0% by weight of the weight of the material.

2. A fuel material according to claim 1, wherein the uranium carbide is composed of 49.5 atomic percent uranium and 50.5 atomic percent carbon.

References Cited

UNITED STATES PATENTS 3,232,717  2/1966  Hill et al. _____ 252—301.1

OTHER REFERENCES

Nuclear Science Abstracts, Abstract No. 19,869, vol. 15, No. 15, Aug. 15, 1961.

Nuclear Science Abstracts, Abstract No. 27,962, vol. 17, No. 16, Aug. 31, 1963.

Nuclear Science Abstracts, Abstract No. 33,468, vol. 16, No. 24A, Dec. 31, 1962.

BENJAMIN R. PADGETT, *Primary Examiner.*

S. J. LECHERT, JR., *Assistant Examiner.*